United States Patent
Parker

(10) Patent No.: US 6,585,089 B1
(45) Date of Patent: Jul. 1, 2003

(54) COATED BRAKE PAD AND METHOD FOR SMOOTHING ROTOR SURFACE AND METHOD OF MANUFACTURE

(75) Inventor: James Lawrence Parker, St. Joseph, MO (US)

(73) Assignees: James L. Parker, St. Joseph, MO (US); Beverley Parker, St. Joseph, MO (US)

( * ) Notice: Subject to any disclaimer, the term of this patent is extended or adjusted under 35 U.S.C. 154(b) by 0 days.

(21) Appl. No.: 09/644,580

(22) Filed: Aug. 24, 2000

(51) Int. Cl.[7] .............................................. F16D 65/12
(52) U.S. Cl. ............................ 188/218 XL; 188/251 M
(58) Field of Search ........................ 188/251 A, 251 M, 188/218 XL, 218 R, 250 B, 250 G

(56) References Cited

U.S. PATENT DOCUMENTS

| | | | |
|---|---|---|---|
| 5,056,630 A | * 10/1991 | Fujii et al. | 188/218 XL |
| 5,261,511 A | * 11/1993 | Kibsch et al. | 188/218 XL |
| 5,372,222 A | * 12/1994 | Rhee et al. | 188/218 XL |
| 5,407,035 A | * 4/1995 | Cole et al. | 188/218 XL |
| 5,482,742 A | * 1/1996 | Takamiya et al. | 427/156 |
| 5,622,785 A | * 4/1997 | Gaylor et al. | 188/264 B |
| 5,641,444 A | * 6/1997 | Fujikawa et al. | 264/141 |
| 6,068,094 A | * 5/2000 | Takahashi et al. | 188/251 M |
| 6,110,268 A | * 8/2000 | Gross et al. | 106/36 |

* cited by examiner

Primary Examiner—Matthew C. Graham
(74) Attorney, Agent, or Firm—Samuel Shipkovitz

(57) ABSTRACT

A vehicle brake assembly is provided with a brake friction pad coated to produce a protective layer upon an associated rotor or like element (e.g., brake shoe). The inventive coating is applied as a surface treatment to the friction material of the brake pad, application of the coating in accordance with the inventive method may be performed immediately after manufacture of the brake pad or as an aftermarket performance enhancement for the brake assembly. Copper powder suspended in a resinous material such as a phenolic resin is the preferred material for the coating. The process for coating the brake pad is adaptable for use at a repair facility or auto parts supply store. The protective layer is formed upon the rotor transferring the coating by heat generated during application of the brake pad to the rotor to retard or arrest rotation thereof. Grooves, pits, and other surface imperfections on the rotor surface are filled in by the protective layer, which is formed with just a few applications of the brake pad to the rotor. Noise, vibration, and excessive brake dust are all sub s reduced once the protective layer is formed.

9 Claims, 2 Drawing Sheets

COATED BRAKE PAD AND METHOD FOR SMOOTHING ROTOR SURFACE AND METHOD OF MANUFACTURE

BACKGROUND OF THE INVENTION

The present invention relates generally to friction coatings. More particularly, the invention relates to a friction coating for a brake pad and a method of manufacture.

STATEMENT OF THE PRIOR ART

Various braking devices such as drum brake assembles and disc brake assemblies have been used in automobiles and other transport vehicles as a means to retard or stop vehicle motion. The assemblies typically have a pair of mutually opposed surfaces with a friction material thereon. In the case of disc brake assemblies, the rotor, which rotates along with the wheel and axle of the vehicle, is placed proximate a brake pad. The brake pad is movable axially relative to the rotor, the brake pad serving to retard or stop the motion of the rotor when in contact therewith. One problem with these assemblies is that the rotor can become scored or pitted to the point that replacement of the rotor is necessary. Another drawback commonly associated with these assemblies is the tendency to produce "squeal" or undesirable low frequency vibrations or other noise caused by vibration during use, especially during the "break in period". Many different techniques have been used to create friction surfaces for the brake pads and/or rotors in order to overcome these drawbacks, with varying degrees of success.

In automotive brakes the rotor is normally gray iron, the rotor being bolted to the wheel which turns and the friction is caused by the caliper compressing the brake pad against the rotor. In automotive repair shops this brake rotor is normally turned or machined on a brake lathe prior to new brake pads being installed. The resulting surface of the rotor is not as smooth as the original surface when the rotor was new, and the surface may still retain many of the surfing imperfections. These surface imperfections contribute to squeal, vibration, brake dust, and excessive brake wear, thereby reducing the overall performance of the brake system.

U.S. Pat. No. 5,339,931 issued to Jacko et al. is directed to a friction material for a brake pad which includes copper powder. In accordance with the specification, scoring of the rotor is to be reduced by deforming and smearing of the copper powder as the brakes are applied. The copper powder, in response to temperatures generated by braking, produces a glaze covering the rotor which prevents scoring. The '931 copper powder, which makes up from 2–18 percent by weight of the friction material, is distributed throughout the brake pad friction material at the time the brake pad is manufactured. The aluminum rotor is a relatively new technology designed for original equipment manufactures to be able to replace the current use of cast iron rotors with aluminum matrix rotors (AL-MMC). This is in an effort to reduce the overall weight of new vehicles to improve gas mileage. By contrast, the present invention is directed to a "break in" coating applied to conventional or any brake pads. Break in of the inventive pads, and reconditioning of the associated rotor, is simultaneously facilitated by the application of a coating containing a mixture of copper powder and resin to the friction surface of the brake pads. Application of the coated brake pads of the invention to the rotor during braking operations causes the mixture to be evenly spread upon the rotor surface, thereby causing the copper to fill any pores, cracks, and grooves which may be in the rotor during the break in period. It should be noted that the coated brake pads of the present invention are intended primarily for use with used rotors; as the new rotors already have a smooth friction surface. The mixture is applied after manufacture of the conventional brake pads and functions as an aftermarket performance enhancement for the brake system, the application process being adaptable for use at, e.g., an automobile repair facility.

SUMMARY OF THE INVENTION

In order to accomplish the objectives of the invention a vehicle brake assembly is provided with a brake friction pad coated in accordance with the inventive method to produce a protective layer upon an associated rotor or like element (e.g., brake shoe). The inventive coating is applied as a surface treatment to the friction material of the brake pad, application of the coating in accordance with the inventive method may be performed immediately after manufacture of the brake pad or as an aftermarket performance enhancement for the brake assembly. Copper powder suspended in a binder, such as resinous material, such as a phenolic resin, is the preferred material for the coating. Highly heat conductive materials of the relative consistency or softness of copper may substitute for copper. The process for coating the brake pad or rotor is adaptable for use at a repair facility or auto parts supply store in addition to being mass produced by a parts supplier, such as FCI Marketing, Inc. of St. Joseph, Mo., owned by the instant inventor. The protective layer is formed upon the rotor by pressure and heat generated during application of the brake pad to the rotor to retard or arrest rotation thereof. Grooves, pits, and other surface imperfections on the rotor surface are filled in by the protective layer, which is formed by transfer of the primarily copper powder of the coating, with just a few applications of the brake pad to the rotor. Noise, vibration, and excessive brake dust are all substantially reduced once the protective layer is formed.

Accordingly, it is a principal object of the invention to provide a new and improved coating for a brake pad.

It is a major object of the invention to provide a new and improved fiction coating for a brake pad which improves the performance of an adjacent rotor.

It is another object of the invention to provide a method of manufacturing a coated brake pad.

It is another object of the invention to provide a method for treating a rotor using a specially coated brake pad.

It is another object of the invention to provide a method of extending the life of a brake pad and rotor.

It is another object of the invention to provide a method of extending the life of a brake pad and an associated rotor by coating the brake pad so as to form a protective layer upon the rotor during the break-in period of a brake pad.

Finally, it is a general object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION

Figure 4:
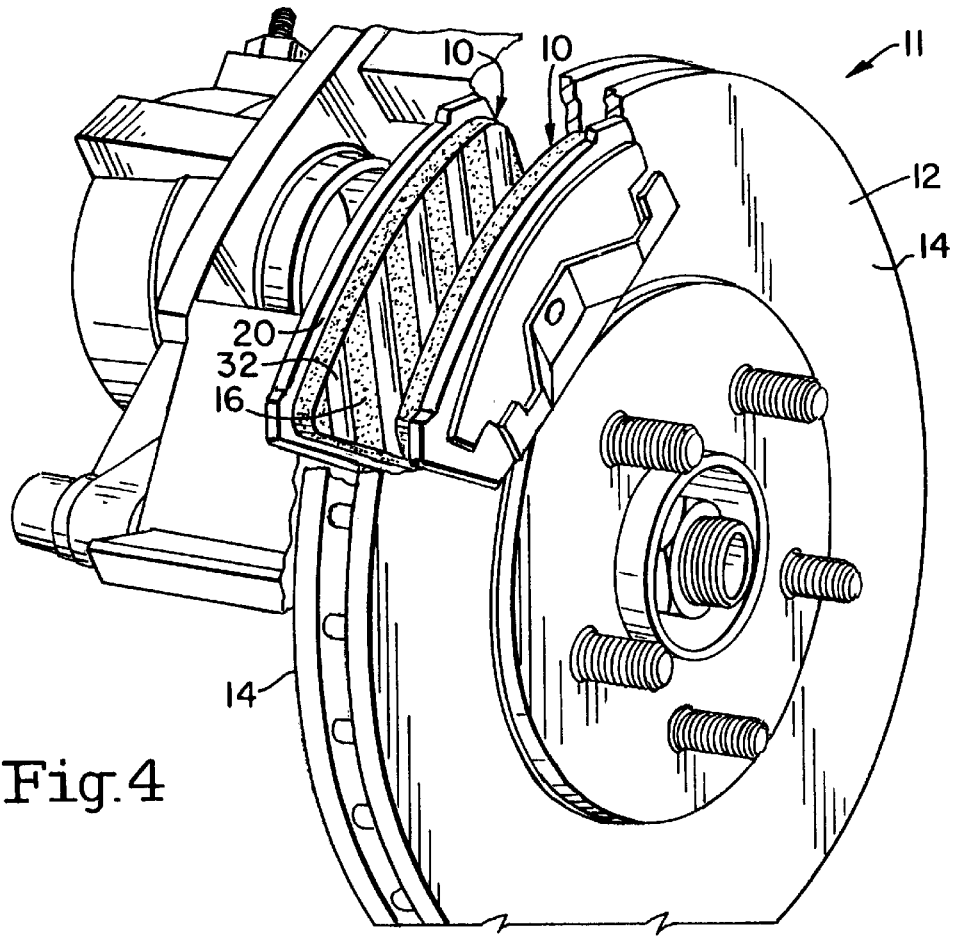
FIG. 4 shows a perspective view of the coated brake pad of the invention in relation to the rotor.

Referring now to FIGS. 1–4, a preferred embodiment of the coated brake pad of the present invention, generally indicated by the numeral 10, and the associated process are illustrated. The coated brake pad 10 is used in a brake assembly 11 in combination with a counter friction element such as a rotor 12 having opposite sliding surfaces 14 adapted for contact with the surface 16 of the brake pad 10. While the coated brake pad 10 is shown as a brake pad compatible with a disc brake system as illustrated in FIG. 4, the coated brake pad 10 of the invention may be employed with any braking system incorporating two friction elements having mutual opposed friction surfaces capable of selectively coming into mutual contact to effect braking.

The brake pad 10 comprises a substrate or backing 20 having a friction material 22 formed thereon. Friction material 22 can be virtually any type of friction material known to be useful in brake systems such as semi-metallic friction materials, low-metallic fiction materials, asbestos organic, ceramic, and others as are known in the art. The surface 16 of the friction material 22, which is subject to continuous wear, is coated with a slurry or paste 26 which forms a protective layer 27 upon contact surface 14 of the rotor 12 as will be explained in more detail later.

Method of Manufacture

Figure 2:
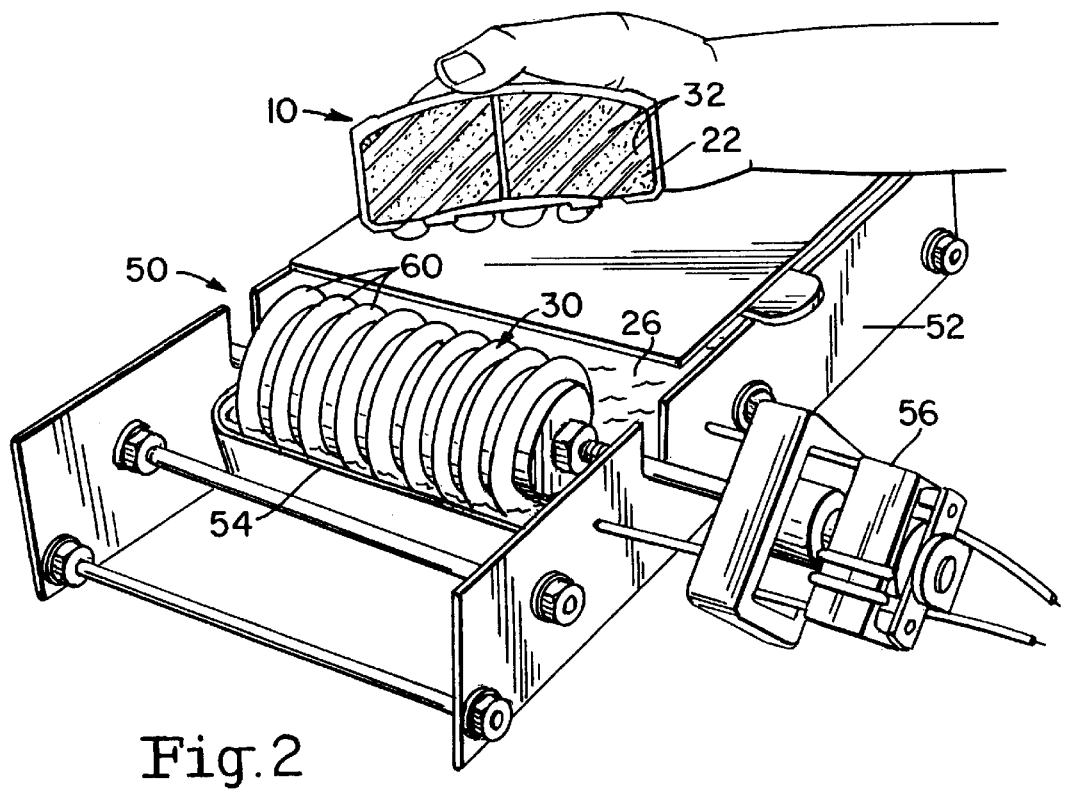
FIG. 2 shows a perspective view of a fist step of the coating process for coating the brake pad shown in FIG. 1.
Figure 3:
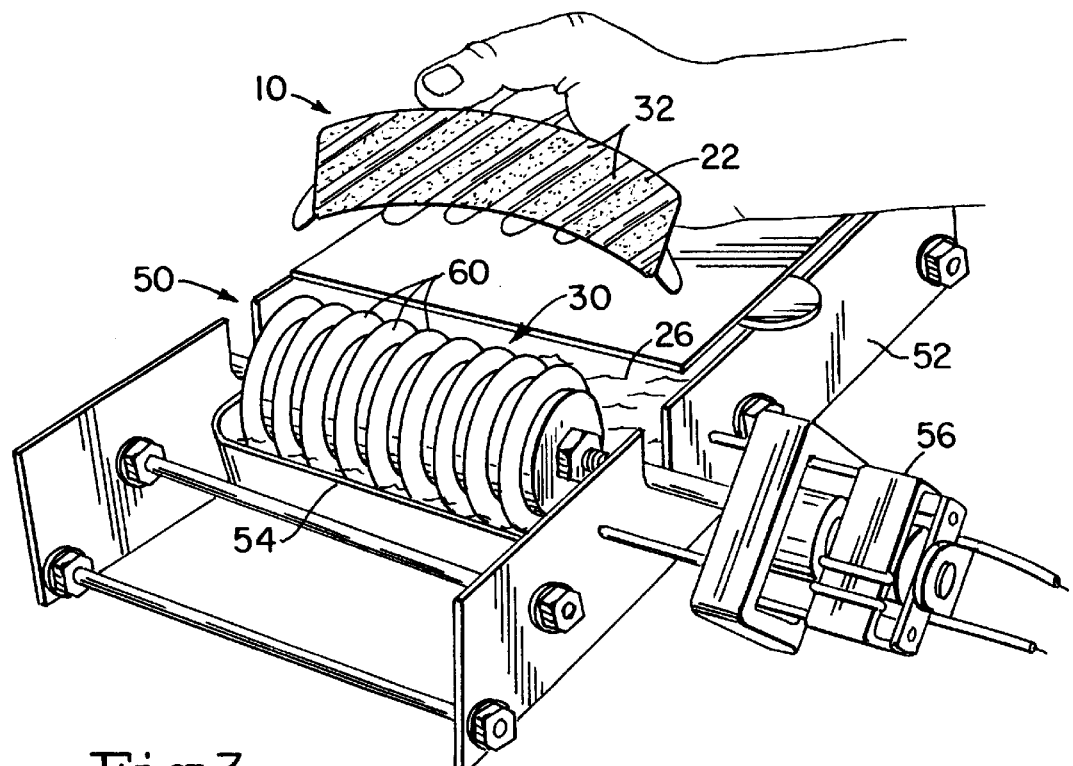
FIG. 3 shows a perspective view of a second step of the coating process for coating the brake pad shown in FIG. 1.

Transfer of the paste 26 onto the surface of the friction material 16 of the brake pad 10 is preferably accomplished using a slotted roller 30 such as that shown in FIGS. 2 and 3. Any of several well known techniques for applying the paste 26 to the friction material 16 may be employed such as brush coating and spray coating. Roller 30 applies the paste 26 onto the surface of the friction material 16 in accordance with a predetermined pattern. In accordance with a preferred embodiment, the paste 26 is applied as a series of transverse stripes approximately ⅜" wide followed by a space approximately ⅜" wide, the stripes are applied diagonally at approximately 45 degrees to produce a coating 32. Even dispersion of the coating 32 onto the rotor surface 16 to form the protective later is facilitated by this arrangement. When dried or cured the thickness of the coating 32 is about 0.040 to 0.050 inches As has been previously mentioned, roller 30 is employed to apply the paste 26 to the surface 16 of the brake pads 10. Referring particularly to FIGS. 2 and 3, the roller assembly 50, including roller 30, a reservoir 52 for containing premixed paste, and a trough 54 for transferring the paste 26 onto the roller 30 is shown.

The composition for the paste 26 is preferably prepared from the following ingredients:

| COMPONENT OF COATING | WEIGHT PERCENT (WET) | WEIGHT PERCENT AFTER CURE |
|---|---|---|
| diluted phenolic resin | 50 | 22 |
| copper powder | 50 | 78 |

The phenolic resin is diluted by adding 5 parts thinner (ethanol anhydrous, such as Thompson Chemical Prop. ANHY50) to 1 part liquid resin (such as Schenactady Int'l HRJ-14209). This mixture is thickened by adding copper powder and mixing until it becomes a thick slurry or paste 26. Alternatively, a thinner liquid phenolic resin (such as Schen. Int'l HRJ4419) diluted by adding 3 parts thinner to 1 part said liquid resin could be used. This mixture is about 50% thinner/resin and about 50% copper. The paste 26 is then poured into reservoir 52 which is in fluid communication with trough 54. The roller 30 is rotated by motor 56, or otherwise, causing the individual roller elements 60, spaced as described above, to rotate and pick up the paste 26 for transfer to the brake pad 10, which may be manually held in place during the transfer. Alternatively, a mechanism (not shown) for holding the pads 10 in position during the transfer may be provided, the mechanism possibly including means for transporting the pads 10 to a drying area as would be expedient to one of skill in the art. The pads 10 are held so as to come into contact with roller elements 60 to effect the transfer of the paste 26. After the paste 26 is applied to the brake pad surface 16, the coated brake pads 10 are placed on drying racks (not shown) to dry. After the thinner evaporates the remaining coating 32 is approximately 78% copper powder and 22% phenolic resin. A range of 40 to 95 percent copper powder is the practical range.

The phenolic resin is used as the initial binding agent to hold the copper on the brake pad 10. After the brakes are installed, the friction causes heat which makes the phenolic resin-copper compound flow into the pores, cracks, and crevices in the brake rotor 12. The phenolic resin is heat activated and liquifies by the friction heat of the brake pad-rotor contact which helps the copper attach to the rotor 12, and the copper resin compound then sets.

Referring now to FIG. 4, the disc brake assembly 11 is shown in detail. It can be seen that the rotor is formed with opposite sliding surfaces 14 near which the coated brake pads 10 are movably disposed. The brake pads 10 are adapted to be forced against sliding surfaces 14 of the rotor 12 during braking. It should be noted that the rotor 12 may be made from cast iron, stainless steel, or any of several metal composites as are known in the art.

Figure 1:
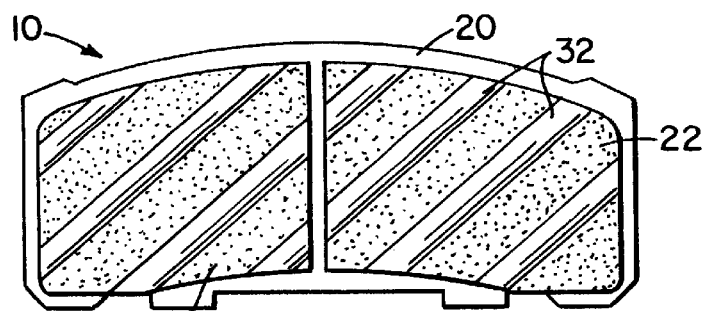
FIG. 1A shows a plan view of the coated brake pad of the present invention.
FIG. 1B shows a cross section of the coated brake pad in position adjacent to a rotor prior to transfer of the coating.
FIG. 1C shows a cross section of the coated brake pad in position adjacent to a rotor after transfer of the coating.
Figure 1B:
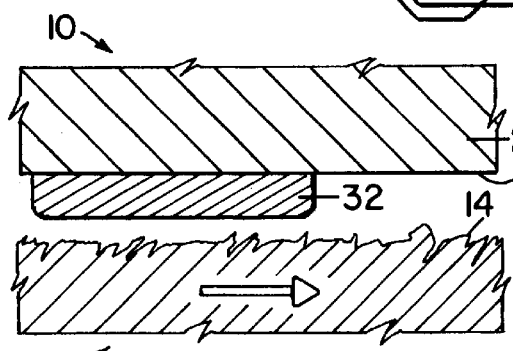
Figure 1C:
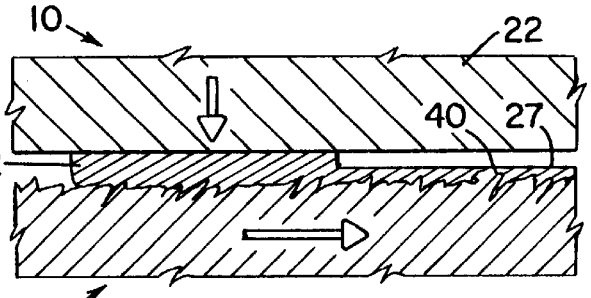

In operation, the protective coating 27 is formed by applying pressure to the surface 16 of the brake pad 10, after coating thereof in accordance with the above described method, to the opposite sliding surfaces 14 of the rotor 12. Before use of the coated brake pad 10 the components appear as in FIG. 1B. The rotor surface 14 roughness regulates the thickness of the initial copper transfer as can be seen more clearly in FIG. 1C. The rougher the surface 14 of the brake rotor 12 the more copper is needed to fill the pores, cracks, and crevices in the brake rotor 12. The remainder of the copper is forced into the pores of the brake pad 10 and is used to continue the coating process and to improve the interface between the rotor and brake pad surface, especially during the break in period. Only a few applications of the brake pad 10 to the rotor 12 are required, so that a test drive performed by a technician employed to change the brakes is sufficient to from protective layer 27. It can be appreciated that the rotor surface 14 high spot 40 determines the coating level applied.

The protective layer 27 helps prevent flash heating or hot spotting. When the two sliding friction surfaces 16, 14 first touch they make contact only on their high spots, these high spots do all the work and at the microscopic surface it creates flash heat which causes the hot spot to swell and expand because of the concentrated heat. This makes the high spot higher and the problem gets worse. Eventual the hot spots can get so hot that the rotor surface 14 particles can become molten and in this state transfer to the brake pad and cause scoring of the brake lining 16 and rotor surface 14.

Noise, slipstick, and vibration are also reduced when the friction surfaces 14, 16 are sliding less irregularly when the copper fills in and smooths the rotor surface.

Alternatively, the coating may be applied to the rotor and result in rotor surface smoothing under the same principles discussed above.

Premature brake wear caused by galling of the friction surfaces 16, 14 and the rotor surface roughness is also avoided when the protective layer 27 is formed. When two metals of the same type and hardness are rubbed together they will gall. The copper coats the rotor 12 which helps eliminate galling or chafing. This is because the copper is softer than the cast iron rotor and the metal fibers that are in most brake pad compounds. The copper in the protective layer 27 also helps in the heat dissipation. Heat is a by product of friction. The friction converts kinetic energy to heat. This heat dissipates and is transferred into the mass of the rotor 12 and the brake pads 10. The copper, having a high thermal conductivity, helps to efficiently transfer this heat. Other materials having the thermal conductivity, relative softness, and other properties of copper may be substituted for copper. Similarly, other binders having the properties of phenolic resin may be substituted for said resin.

From the foregoing description, one skilled in the art can easily ascertain the essential characteristics of this invention and, without departing from the spirit and scope thereof, can make various changes and modifications of the invention to adapt it to various usages and conditions.

It is to be understood that the present invention is not limited to the sole embodiment described above, but encompass any and all embodiments within the scope of the following claims:

What is claimed is:

1. A brake pad for a brake assembly, said assembly having a counter friction element, the brake pad comprising:
   a friction material having a surface adapted for contact with a brake counter-friction element, said friction material formed upon a backing;
   a coating comprising copper powder applied to the surface of said friction material, said coating adapted for transfer to said counter-friction element.

2. The brake pad of claim 1 wherein said coating contains a binder material.

3. The brake pad of claim 2 wherein said binder material is substantially phenolic resin.

4. The brake pad of claim 1 wherein said coating comprises from 40 to 95 percent copper powder and from 5 to 60 percent binder.

5. The brake pad of claim 4 wherein said binder comprises a phenolic resin.

6. The brake pad of claim 1 wherein said counter friction element is a disc brake rotor.

7. The brake pad of claim 1 wherein said counter friction element has a friction surface, said friction surface being substantially smooth after transfer of said coating.

8. A coated rotor, said coating comprising copper powder, wherein during application of an opposed brake pad to said rotor the surface of the rotor becomes smoother until the coating is substantially dissipated.

9. The apparatus of claim 8 wherein said coating also comprises a binder.

* * * * *